Jan. 14, 1941.  S. W. GLICKSTON  2,228,599
MACHINE FOR MAKING MEDICAL SWABS
Filed Sept. 9, 1939 7 Sheets-Sheet 1

Fig. 1

INVENTOR.
SAMUEL W. GLICKSTON.
BY John P. Chandler
his ATTORNEY.

Jan. 14, 1941. S. W. GLICKSTON 2,228,599
MACHINE FOR MAKING MEDICAL SWABS
Filed Sept. 9, 1939 7 Sheets-Sheet 2

INVENTOR.
SAMUEL W. GLICKSTON.
BY John P. Chandler
his ATTORNEY.

Jan. 14, 1941.   S. W. GLICKSTON   2,228,599
MACHINE FOR MAKING MEDICAL SWABS
Filed Sept. 9, 1939   7 Sheets-Sheet 4

INVENTOR.
SAMUEL W. GLICKSTON.
BY John P. Chandler
his ATTORNEY.

Jan. 14, 1941.　　　S. W. GLICKSTON　　　2,228,599
MACHINE FOR MAKING MEDICAL SWABS
Filed Sept. 9, 1939　　　7 Sheets-Sheet 5

Fig. 6

INVENTOR.
SAMUEL W. GLICKSTON
BY John P. Chandler
his ATTORNEY.

Jan. 14, 1941. S. W. GLICKSTON 2,228,599
MACHINE FOR MAKING MEDICAL SWABS
Filed Sept. 9, 1939 7 Sheets-Sheet 7

INVENTOR.
SAMUEL W. GLICKSTON
BY John P. Chandler
his ATTORNEY.

Patented Jan. 14, 1941

2,228,599

UNITED STATES PATENT OFFICE 2,228,599

MACHINE FOR MAKING MEDICAL SWABS

Samuel W. Glickston, Rockville Centre, N. Y.

Application September 9, 1939, Serial No. 294,133

10 Claims. (Cl. 19—145)

This invention relates to new and useful improvements in machines for applying fibrous material to various members, and relates more particularly to an automatic machine for making medical swabs and the like, the present application constituting a continuation in part of my co-pending application Serial No. 141,274.

Medical swabs for many years have been made by hand, this operation consisting generally of holding a small piece of cotton between two fingers and twirling the end of a stick while in engagement with this cotton, thus forming a tip about the end of the stick.

In my co-pending application I disclosed an automatic machine whereby cotton was applied to each end of a stick, the machine consisting generally of stick-transporting means whereby the stick, during its course of movement, forces the terminals of webs of cotton into recessed shapers and after the stick has been so positioned with its terminals in the shapers the shapers are caused to revolve, thereby winding the ribbon of cotton about the ends of the stick.

The present application is directed primarily to the subject matter of said co-pending application, more emphasis, however, being given to the precise structure of the machine and to its operation than was given in my earlier application. The present application is also a continuation-in-part of my co-pending application Serial No. 248,764 on Swab making machines.

Figure 1:
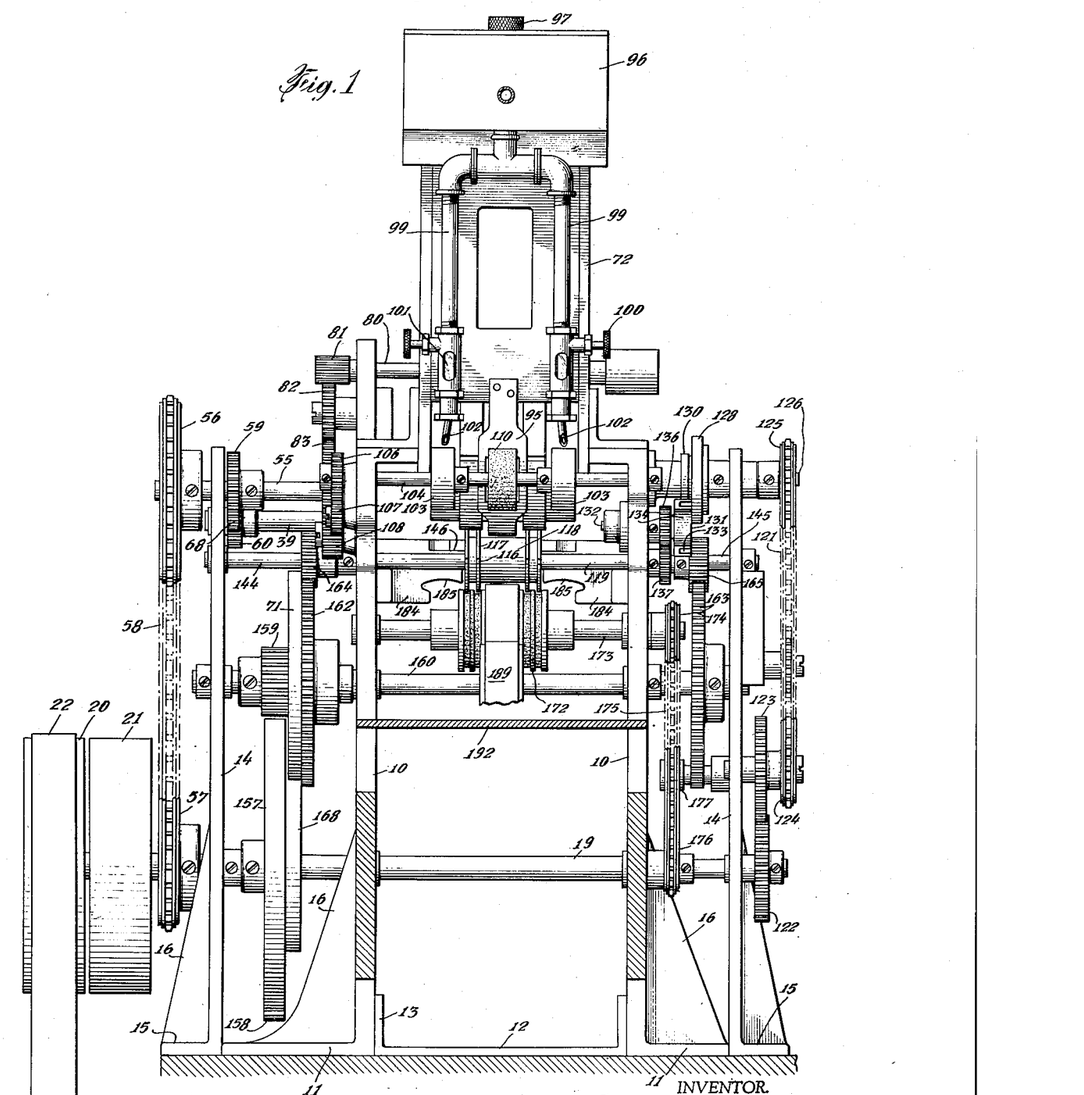
Fig. 1 is a front elevation of the machine constituting the presently preferred embodiment of the present invention, a portion of the framework thereof being shown in section.

The machine constituting the present invention includes a pair of spaced vertical frame members 10 provided with horizontal portions 11 which are mounted on a suitable support, such frame members being secured at their lower ends in their spaced relation by means of a horizontal frame member 12 having vertical portions 13, all as shown in Fig. 1. The frame structure further includes a second set of vertical frame members 14 provided with horizontal portions 15, also mounted on the horizontal support adjacent to the opposed terminals of the portions 11. Each of the frame members 10 and 14 is desirably formed with substantially triangular reinforcing webs 16.

A main drive shaft 19 is journalled in all four frame members, the shaft having an idler pulley 20 at one end thereof, and a driver pulley 21 adjacent thereto, such latter pulley being driven by a belt 22 connected with a suitable source of power (not shown).

*The cotton-preparing rollers*

All of the moving members in the machine are driven by the drive shaft 19 and the stretching and flattening rollers for preparing the cotton, together with the supporting means therefor, will be the first of such members to be described. An angle bracket 26 (Fig. 3) is suitably secured to the rear vertical edges of the frame members 10 at a point spaced from the upper terminals of such frame members, such bracket extending between such frame members.

A horizontal plate 28 is secured on the upper surface of said bracket and extends somewhat to the rear of such frame members. Adjacent to the outer terminal of this plate a block 29 is secured and a pair of spaced channels 30 are mounted above the plate 28 by means of supports 31 extending diagonally upwardly from the block 29. The two channels 30 are spaced apart a distance equal to substantially the length of the sticks to which the cotton is applied at each end thereof.

A length of cotton 33 from a roll (not shown) passes over each of the channels 30 and passes between three pairs of rollers, the rollers constituting each pair being positioned one above the other. Inasmuch as each shaft carries two spaced rollers of similar construction, one for each web of cotton, only one roller on each shaft will be described. The upper and lower rollers constituting each pair are designated 36, 37 and 38, respectively (Figs. 2 and 7), the upper rollers being mounted on shafts 39, 40 and 41, and the lower rollers being mounted on shafts 42, 43 and 44, respectively.

The two rearward pairs of rollers 37 and 38 (upper and lower) are desirably formed with longitudinal splines which firmly engage the cotton in its passage therethrough and flatten the same. In some instances, however, depending on the precise character and texture of the cotton, the upper roller in each pair may be formed with splines, or may be otherwise non-smooth, and the lower roller may be smooth, or vice versa. This, of course, is a matter of choice and expediency.

Figure 6:
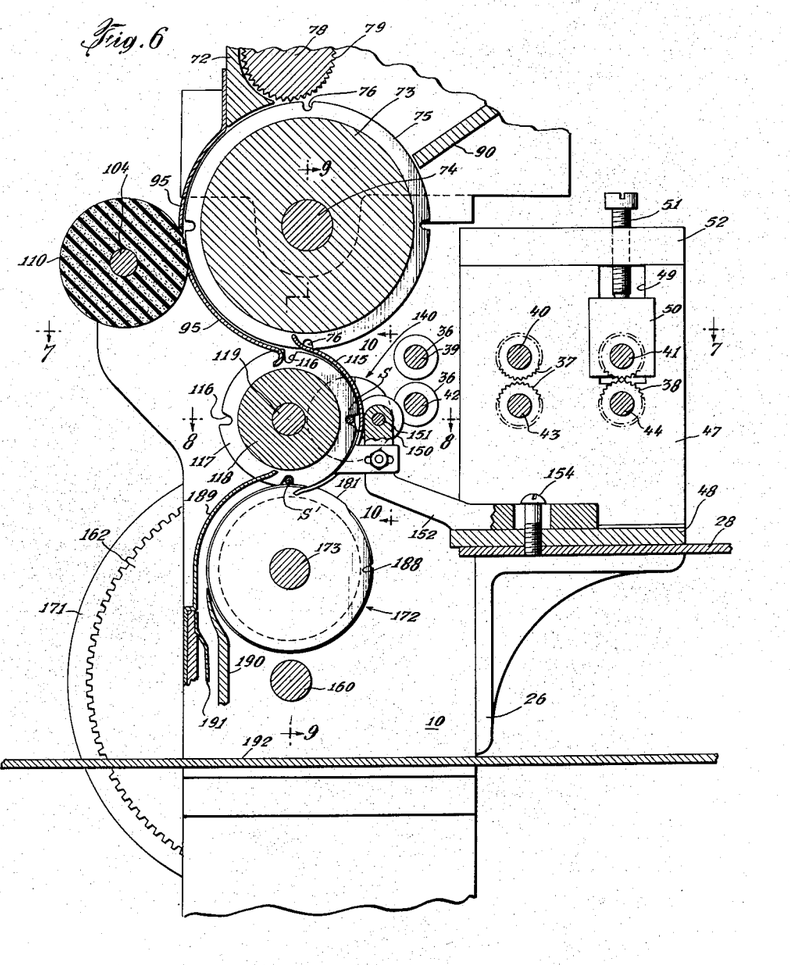
Fig. 6 is a broken, longitudinal, vertical section taken through the center of the machine.
Figure 7:
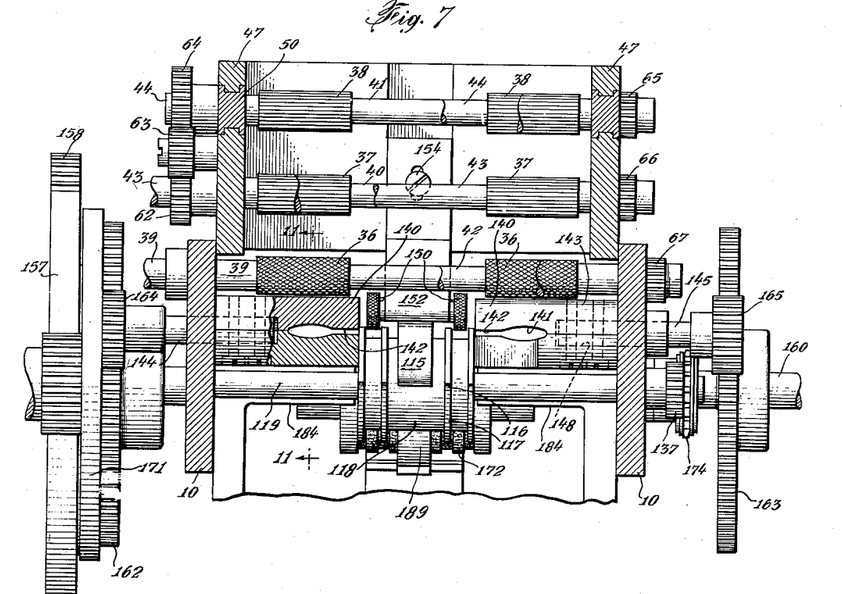
Fig. 7 is a transverse, horizontal section taken on line 7—7 of Fig. 6.

The forward rollers 36 are illustrated as formed with two way, diagonally disposed recesses in order to give these rollers an even firmer grip upon the cotton just before it is applied to the stick. The shafts 40, 41, 43 and 44, carrying the rearward rollers 37 and 38, are journalled in vertical frame members 47 having horizontal flanges 48 (Fig. 3) at their lower ends, such flanges being mounted on the upper surface of the plate 28. In order to give the rollers on the upper rearward shaft 41 a measure of vertical adjustability, a vertical slot 49 is formed in each frame member 47 and the shaft is journalled in a slotted bearing block 50 which is vertically movable within such slot, as shown in Figs. 6 and 7. Vertical adjustment of the block is obtained by means of a screw 51 mounted at its upper end in a horizontal crosspiece 52.

Figure 2:
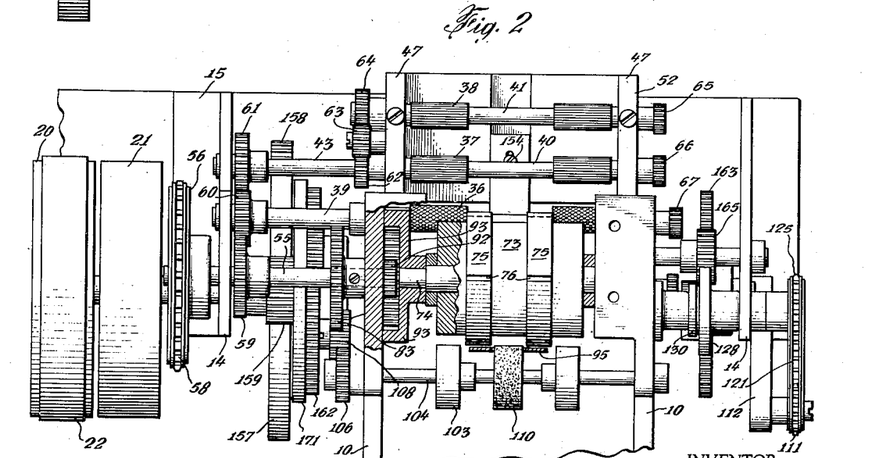
Fig. 2 is a top plan view of the main operative portion of the machine, the stick hopper having been removed.

The shafts 39 and 42 carrying the upper and lower forward rollers 36 are journalled in the upper end of the main frame members 10 and the shaft 39 and the shaft 43 extend into the frame members 14 as well (Fig. 2). In order to properly stretch the web of cotton into a flat ribbon which may be suitably wound about the stick to form the swab, the forward rollers 36 turn at a greater speed than the rollers 37 and the rearward rollers 38 revolve slower than the rollers 37. The following means are provided for causing the shafts to revolve in this manner.

Figures 4, 5:
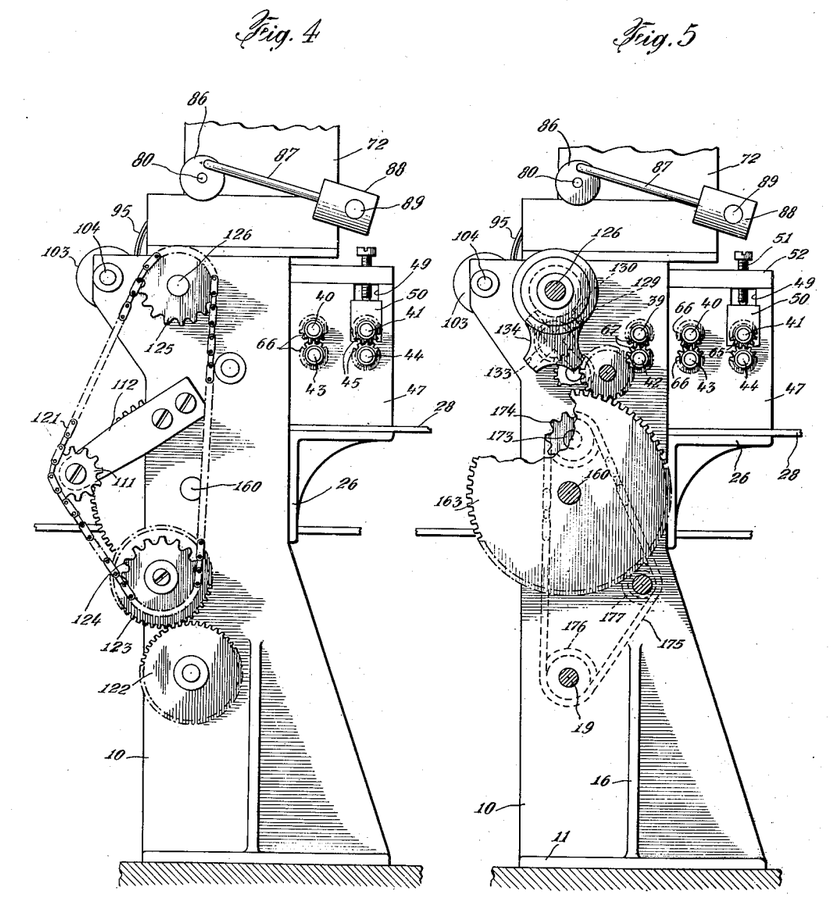
Fig. 4 is an elevation of the right hand side of the machine, a portion of the stick hopper being broken away.
Fig. 5 is a partial side of the elevation of the machine, certain portions of the framework being broken away to show certain operative parts of such machine.

A short shaft 55 (Figs. 1 and 2) is journalled between the left hand frame members 10 and 14, such shaft having a sprocket wheel 56 keyed thereto. A sprocket wheel 57 is also keyed to the drive shaft 19 and a chain 58 connects these sprockets. A gear 59 on the shaft 55 drives a gear 60 on the shaft 39 carrying the upper forward rollers 36. A gear 61 on the shaft 43 carrying the intermediate lower rollers 37 is also engaged by the gear 60, such gear 61 being larger than the gear 60 in order to drive the shaft 43 slower than the shaft 39. A gear 62 also on the shaft 43 engages an idler 63 which in turn engages a gear 64 on the lower rearward shaft 44, the gear 64 being larger than the gear 62 in order to drive the shaft 44 slower than the shaft 43. Rotation of the lower shaft 44 is transmitted to the short upper shaft 41 (Fig. 5) by means of gears 65 and the rotation of the shaft 43 is transmitted to the shaft 40 by means of gears 66.

Thus shafts 43 and 44, respectively, are driven progressively slower than the upper shaft 39 carrying the forward rollers and rotative movement of shaft 39 is transmitted to lower forward shaft 42 by means of gears 67.

*The stick feeding mechanism*

Figure 3:
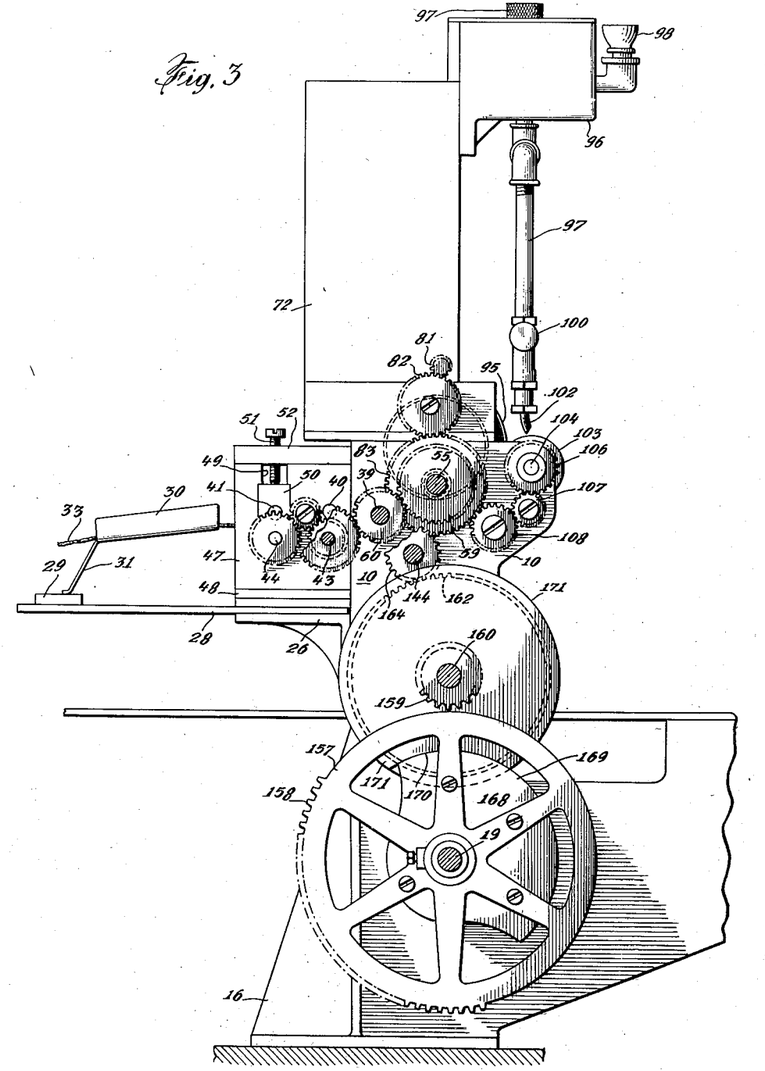
Fig. 3 is an elevation of the left hand side of the machine relative to Fig. 1, portions of the framework having been removed to show certain of the internal portions of the apparatus.

A substantially rectangular hopper 72 for the sticks is mounted on the upper ends of the frame members 10. A cylindrical stick carrier 73 is mounted on a shaft 74 at the lower end of the hopper, such carrier being formed with a pair of spaced annular portions 75, such annular portions being formed with a plurality of equally spaced recesses 76 into which the sticks 77 fall to be delivered to the cotton winding position. In order to agitate the sticks and at the same time keep them in substantial alignment with the aligned recesses 76 in the stick carrier 73, a cylindrical member 78 having longitudinal splines 79 is mounted on a shaft 80 at the lower end of the hopper. A small gear 81 at the outer end of this shaft is driven by a larger idler gear 82 which in turn is driven by a gear 83 on the shaft 55 (Fig. 3).

At the opposite end of the shaft 80 a hub 86 is keyed and a driving lever or arm 87 is eccentrically mounted at one end thereof on this hub, the opposite end of the lever carrying a block 88 which is adapted to reciprocate when the shaft 80 revolves. A shaft 89 passing through this block is connected by means not shown to a hinged door 90 (Fig. 6) at the rear lower side of the hopper. Thus, as the shaft 80 carrying the splined cylindrical member rotates, the door oscillates, thereby sufficiently agitating the sticks to move the same into the recesses 76 in the stick carrier as the latter revolves.

The following means are provided for imparting relatively slow but continuous rotation to the shaft 74 carrying the stick carrier 73. A small gear 92 at the inner end of the shaft 55 engages the teeth of an internal gear 93 (Fig. 2). Thus the sticks are carried, one by one, in the direction of the arrow in Fig. 6 and a curved guide plate 95 prevents the sticks from falling from the recesses 76.

As the sticks continue their arcuate movement, an adhesive is applied to their terminals in the following manner. A reservoir 96 having a closure cap 97 for the filling inlet and an overflow indicator 98, is mounted adjacent to the upper end of the hopper. The adhesive passes downward through a pair of spaced feed pipes 99 having thumb-turn valve 100 and visible indicating means 101. The adhesive passes out through small terminal pipes 102 onto applying roller 103 mounted on a shaft 104 journalled between the frame members 10. Thus, as the stick continues its downward movement, the terminals thereof are engaged by adhesive applying rollers which are caused to rotate by means of a gear 106 at one end of the shaft 104, such gear engaging an idler 107, in turn engaged by an idler 108, which latter is driven by the gear 83 on the shaft 55 (Fig. 3). In order to prevent the stick from bending while being engaged by the adhesive applying rollers, it is engaged in the center by a resilient roller 110 in the center of the shaft 104.

Referring now to Fig. 6, the stick continues its arcuate movement approximately 180°, it being held in the recesses 76 all during the movement by means of the curved guide plate 95. An ejector 115 made from flat spring steel projects into the recess between the annular portions 75 having the recesses 76 therein, and when the stick reaches its maximum lowered position adjacent to the terminal of the guide plate 95 it is ejected from such recesses 76 and falls into the aligned recesses 116 in a plurality of spaced annular flanges 117 formed in a second rotary stick carrier 118 mounted on shaft 119. In the embodiment shown, this stick carrier is provided with four sets of equally spaced aligned recesses 116. This carrier, unlike the constantly rotating carrier 73, is intermittently rotatable through an arc of 90°, the following driving means being provided. The main drive shaft 19 is provided at its right hand terminal with a gear 122, such gear engaging an idler 123 carrying a sprocket 124. A chain 121 connects this sprocket with a second sprocket 125 carried on a shaft 126 journalled between the two right hand frame members 10 and 14. In order to give the chain adjustable tensioning means, an idler sprocket 111 is mounted on an arm 112 secured to the frame 10.

The shaft 126 carries a conventional driving element 128 of a Geneva movement, the element comprising a driving pin 129 (Fig. 5) and a concentric locking surface 130. The driven element 131 is a four star member and is mounted on a stud shaft 132 and comprises four slots 133 and intermediate concavely curved surfaces 134. Thus one revolution of the driver 128 imparts one quarter revolution to the driven element which also carries an idler 136 engaging a gear 137 on the shaft 119.

The cotton winding mechanism

Figure 11:
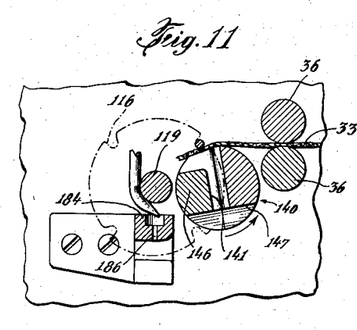
Fig. 11 is a broken, longitudinal section taken on line 11—11 of Fig. 7.
Figure 12:
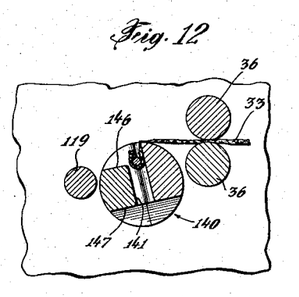
Fig. 12 is a broken, longitudinal, vertical section taken through one of the cotton shapers and the forward pair of rollers.

The arcuate movement of the stick from the time it leaves the first stick carrier 73 until it comes to rest for the cotton winding operation, shown at S in Fig. 6, is shown in detail in Figs. 11 and 12. The cotton 33 is constantly fed, as heretofore stated, through the forward rollers 36 and the forward terminal of such cotton passes slightly beyond the vertical recess in the intermittently rotating shaper, of which there are two. The construction and operation of such shapers will now be described.

Figure 8:
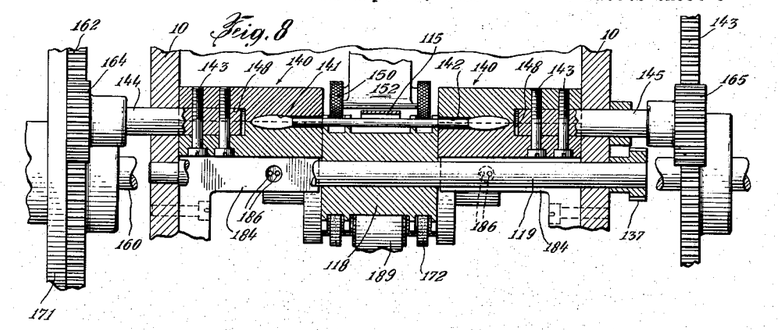
Fig. 8 is a broken horizontal section taken on line 8—8 of Fig. 6.

The shaper 140 is desirably made in two halves, forming, when assembled, a generally cylindrical member. A recess 141 extends from the upper to the lower surface thereof, this recess being shaped to form the swab around the terminal of the stick, as clearly shown in Figs. 7 and 8. The shaper further has a reduced portion 142 between this portion and its inner terminal. The two portions of the shaper are bolted together as shown at 143, a circular longitudinal recess 148 being formed between the two portions to receive the shafts 144 and 145, respectively, upon which they are mounted. In order to permit the stick to enter the recess at its upper end with more ease, there is formed a cut-away portion as shown at 146 and further arcuate movement of the stick after the swab is formed is facilitated by means of a cut-away portion 147 at the lower side of the shaper. Fig. 11 shows the cotton having been fed beyond the recess 141 on the upper surface of the shaper, and the stick 77 is following its 90° arcuate movement to the swab forming position shown at S in Fig. 6. During this movement the former is stationary and as the stick continues to move, it engages the cotton and moves it into the recess and downward until the stick is aligned with the axis of the shaper.

Figure 10:
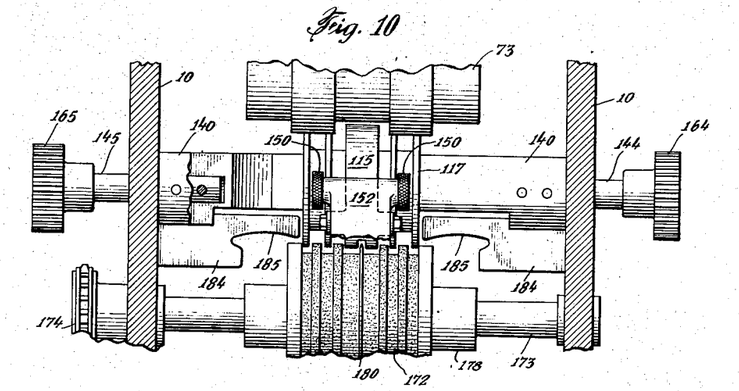
Fig. 10 is a broken, transverse, vertical section taken on line 10—10 of Fig. 6.

During the rotary movement of the shaper the stick is held immovable by the following means. A pair of knurled rollers 150 are freely mounted on a shaft 151 supported on a bracket 152 (Figs. 6, 7 and 10). This bracket also supports the ejector 115 which is curved and also acts as a guide plate for retaining the stick in the recesses 116 while being carried by the stick carrier 118.

The bracket 152 is adjustably mounted on the flange 48 by means of a screw 154 and the knurled rollers supported by this bracket are so adjusted relative to the recesses 116 in the carrier 118 when the stick is at S (Fig. 6) as to relatively firmly engage the stick to prevent rotation thereof. By mounting these rollers freely on the shaft such rollers do not impede the movement of the stick into and out of their stationary position during the swab forming operation. After the terminals of the stick have descended into the recesses 140 in the shapers and have moved the cotton into place therein the shapers are revolved, thus forming the swab, by the following means. A large gear 157, mounted on the main drive shaft 19 is provided with teeth 158 over something less than half its periphery. As this gear rotates constantly it intermittently engages the teeth of a smaller gear 159 mounted on a shaft 160. Also mounted on this shaft are a pair of spaced larger gears 162 and 163 engaging smaller gears 164 and 165, respectively, on the short shafts 144 and 145 carrying the shapers 140. It is desirable, of course, to hold the shaft 160 against rotation except while the teeth 158 are engaging the gear 159 and to accomplish this a cam member 168 having a concentric surface 169 engaging a concave surface 170 on a disc 171 carried on shaft 160, all as shown in Fig. 3, are provided.

After the shapers have turned their appropriate number of revolutions, the rotary carrier 118 again turns through an arc of 90°, thereby positioning the stick, with the cotton wrapped around each end, at the point indicated at S' (Fig. 6), at which point it again stops wherein it is centrally scored in order to weaken the stick sufficiently to enable it to be cleanly broken if desired.

The scoring roller 172 is made from a number of discs of resilient material mounted on a shaft 173. This shaft is provided with a sprocket 174 at one end which is connected by a chain 175 to a sprocket 176 on the main drive shaft 19. An idler sprocket 177 keeps this chain tight.

Figure 9:
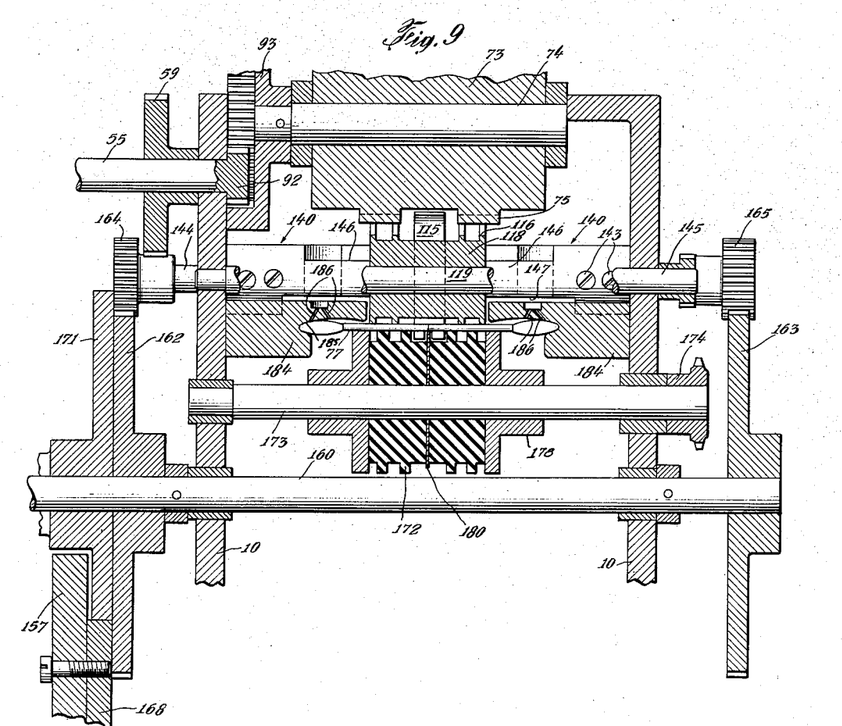
Fig. 9 is a broken, transverse, vertical section taken on line 9—9 of Fig. 6.

A cutting disc 180 is positioned between the portions of the roller and the discs 172 are held in engagement with the cutting discs by means of circular end plates 178 mounted in shaft 173 (Fig. 9). This disc 180 is of a slightly smaller diameter than the external diameter of the rollers 172 except for the cutting portion 181 (Fig. 6), which portion extends beyond the periphery of the rollers. When the stick is carried by the rotary carrier 118 to the lower position indicated at S', such carrier again ceases movement and the constantly rotating rollers 172 rotate the stick while the same is positioned within the aligned recesses 116 of the carrier 118 and when the cutting portion 181 of the cutting disc engages the stick, a slight scoring is made. It will be apparent that during one revolution of the rollers 172, the stick is given several revolutions and during such rotary movement the tips of the stick are in engagement with members 184 having recesses 185 shaped to fit such terminal portions of the swab. Each member 184 is provided with a small vertical aperture 186 therethrough and a small tube 187 (Fig. 13) is positioned just above such aperture, the tube leading to a supply of a suitable antiseptic (not shown). Thus, as the swab revolves as shown at S' in Fig. 13, this liquid is applied to the terminals of the swab.

The Geneva movement operating the shaft 119, carrying the rotary stick carrier 118, is so timed as to rotate a quarter-turn after the scoring rollers have turned one complete revolution. The scoring rollers and cutters are provided with aligned recesses 188, which recesses receive the stick from the position shown at S' and carries the same downward, the stick being removed from the recess 116 in the stick carrier by means of a curved spring member 189, also shown in Fig. 6. The stick is removed from this recess 188 by means of a finger 190 and the finished swab drops downwardly between such finger 190 and a spring-pressed finger 191 onto a platform 192, which may contain the boxes in which the finished swabs are packed.

Figure 13:
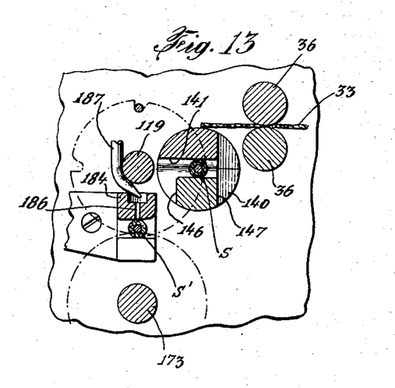
Fig. 13 is a broken, longitudinal, vertical section taken through one of the shapers showing the substantially finished swab and the means for medicating such swab.

The actual winding of the cotton to form the finished swab is completed by the rotary formers 140 in the position shown at S in Fig. 13 and accordingly the true function of the members 184 is to support the cotton terminals of the swab during the scoring operation to prevent the stick being bent to breaking point. Also, the members 184 provide means for applying medication to the swab terminals.

It will be apparent that many modifications and changes may be made in the foregoing specific embodiment of the present invention without departing from the scope thereof as defined by the appended claims. For instance, other stick feeding means may be employed than those illustrated, and if desired, the scoring operation may be eliminated entirely. Also, conveyor means for transporting the boxes into which the completed swabs drop, such as is disclosed in my co-pending application Ser. No. 248,764, may be added to the present machine. Furthermore, whereas the present machine is adapted to form a swab at each terminal of a relatively short stick, it will be apparent that one set of formers may be removed, or the machine may be otherwise modified to form a swab at one end only of a stick of any suitable length.

What I claim is:

1. A machine of the type described comprising a rotary former having an elongated, radially disposed recess therein, means for feeding a length of ribbon-like material adjacent to the former, means for moving a terminal of a stick and the ribbon-like material into the former and means for revolving the former.

2. A swab making machine comprising a rotary former having an elongated, radially disposed recess therein, means for feeding a strip of material and the terminal of a stick or the like into the former and means for revolving the former while the stick is held immovable to wrap the material about the end of the stick.

3. A swab making machine comprising cotton feeding mechanism, a rotary former, means for moving cotton and stick into the former having an elongated, radially disposed recess therein, means for revolving the former to wind the cotton about the stick and means for applying a solution to the cotton.

4. A swab making machine comprising a rotary former, means for feeding a length of fibrous material adjacent to the former having an elongated, radially disposed recess therein, means for moving a terminal of a stick and the length of fibrous material into the former, means for supporting the stick while in such position and means for revolving the former to wind the fibrous material therearound.

5. A machine for making swabs of the class described comprising a pair of spaced rotary formers having longitudinal recesses extending inwardly from one end thereof, means for feeding the terminal of a flattened web of cotton or the like beyond the recesses in the formers, such means comprising a pair of feed rollers between which the cotton is fed, a stick hopper and means for withdrawing sticks, one by one, from the hopper and moving the terminals of such stick into engagement with the cotton and into the recess in the former, means for revolving the former to wind the cotton about the terminals of the stick, and means for severing a length of cotton from the web after the former has made a partial revolution.

6. A machine for making swabs of the class described comprising a frame, a rotary former journalled within the frame and having a longitudinal recess extending inwardly from the end thereof, means for feeding the terminal of a flattened web of cotton or the like beyond the recess in the former, such means comprising a plurality of pairs of rollers between each of which the cotton is fed, means for revolving the forward rollers more rapidly than the rearward ones to stretch and flatten the cotton, a stick carrier adapted to move a terminal of a stick into engagement with the cotton and then move cotton and stick terminal into the recess in the former, means for revolving the former to wind the cotton about the terminal of the stick, the former revolving at such speed relative to the speed of rotation of the forward rollers as to sever a length of cotton from the web.

7. A machine for making swabs of the class described comprising a rotary former having a longitudinal recess extending inwardly from one end thereof, means for feeding the terminal of a flattened web of cotton or the like beyond the recess in the former, such means comprising a plurality of pairs of rollers between each of which the cotton is fed, means for revolving the forward rollers more rapidly than the rearward ones to stretch and flatten the cotton, a stick hopper and means for withdrawing sticks, one by one, from the hopper and moving a terminal of such stick into engagement with the cotton and into the recess in the former, means for revolving the former to wind the cotton about the terminal of the stick, the initial rotary movement of the former severing a length of cotton from the web, means for moving the stick with the cotton wrapped therearound to a second station, means for applying a solution to the swab end of the stick and for centrally scoring the stick at such station and means for revolving the stick thereat.

8. A machine for making medical swabs comprising a rotary former having a longitudinal recess therein extending inwardly from one end thereof, cotton feeding means for delivering the terminal of a flattened web of cotton to a point beyond such recess, a stick hopper and means for withdrawing sticks, one by one, from such hopper and moving a terminal of such stick while in engagement with the cotton, into the recess in the former, means for severing a length of cotton from the web and means for rotating the former, thus wrapping the severed length of cotton about the terminal of the stick while the latter is held immovable and means for discharging the stick with the cotton wrapped therearound.

9. A machine for making medical swabs comprising a rotary former having an elongated, radially disposed recess therein, cotton feeding means comprising a plurality of rollers for delivering the terminal of a web of cotton to a point beyond such recess, means for moving a terminal of a stick and the cotton into the former, and means for rotating the former to wrap the cotton about the terminal of the stick.

10. A machine for making medical swabs comprising a rotary former having a recess therein, cotton feeding means for delivering the terminal of a web of cotton to a point beyond such recess, a stick hopper and means for withdrawing sticks, one by one, from such hopper and moving a terminal of such stick, together with the cotton, into the recess in the former, means for rotating the former, thus severing a length of cotton from the web and wrapping the same about the terminal of the stick while the latter is held immovable and means for discharging the stick with the cotton wrapped therearound.

SAMUEL W. GLICKSTON.